US010763670B2

(12) United States Patent
Trankjær et al.

(10) Patent No.: US 10,763,670 B2
(45) Date of Patent: Sep. 1, 2020

(54) ROTATING TRANSFORMER AND INDUCTIVE COUPLING

(71) Applicant: VESTAS WIND SYSTEMS A/S, Aarhus (DK)

(72) Inventors: Søren Viisholm Trankjær, Ringkøbing (DK); Lars Helle, Suldrup (DK); Torben Petersen, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/302,557

(22) PCT Filed: May 16, 2017

(86) PCT No.: PCT/DK2017/050155
§ 371 (c)(1),
(2) Date: Nov. 16, 2018

(87) PCT Pub. No.: WO2017/198269
PCT Pub. Date: Nov. 23, 2017

(65) Prior Publication Data
US 2019/0206617 A1 Jul. 4, 2019

(30) Foreign Application Priority Data
May 20, 2016 (DK) .................................. 2016 70341

(51) Int. Cl.
*H02J 3/00* (2006.01)
*H02J 3/38* (2006.01)
(Continued)

(52) U.S. Cl.
CPC ................ *H02J 3/00* (2013.01); *H01F 38/14* (2013.01); *H01F 38/18* (2013.01); *H02J 3/386* (2013.01);
(Continued)

(58) Field of Classification Search
CPC .......... H01F 38/14; H01F 38/18; H02J 50/10; H02J 3/386; H02J 7/025; Y02E 10/763
See application file for complete search history.

(56) References Cited

U.S. PATENT DOCUMENTS 5,876,181 A * 3/1999 Shin .......................... F03D 1/06
  415/2.1
6,483,218 B1 * 11/2002 Petrinko ............... H02K 19/365
  310/112
(Continued)

FOREIGN PATENT DOCUMENTS

DE       3732382 A1    4/1989
DE   102008000644 A1    9/2009
(Continued)

OTHER PUBLICATIONS

PCT Written Opinion of the International Searching Authority for Application No. PCT/DK2017/050155 dated Aug. 24, 2017.
(Continued)

*Primary Examiner* — Carlos Amaya
(74) *Attorney, Agent, or Firm* — Patterson + Sheridan, LLP

(57) ABSTRACT

Aspects of the present disclosure are generally directed to using a rotary transformer to transfer power for a wind turbine generator. Certain aspects of the present disclosure are directed to a multi-rotor wind turbine. The multi-rotor wind turbine generally includes a plurality of rotors, a plurality of electrical generators, each coupled to one of the plurality of rotors, and one or more rotary transformers configured to transfer power between the electrical generators and a power grid. In some aspects, each rotary transformer comprises a first winding coupled to one or more electrical generators of the plurality of electrical generators, and a second winding magnetically coupled to the first
(Continued)

winding and coupled to the power grid, wherein the first winding is rotatable with respect to the second winding.

19 Claims, 8 Drawing Sheets

(51) Int. Cl.
*H02J 50/10* (2016.01)
*H01F 38/14* (2006.01)
*H01F 38/18* (2006.01)
*H02J 7/02* (2016.01)

(52) U.S. Cl.
CPC .............. *H02J 7/025* (2013.01); *H02J 50/10* (2016.02); *H02J 2300/28* (2020.01); *Y02E 10/763* (2013.01)

(56) References Cited

U.S. PATENT DOCUMENTS

| | | |
|---|---|---|
| 2007/0007857 A1 | 1/2007 | Cullen et al. |
| 2011/0050377 A1 | 3/2011 | Bjerknes et al. |
| 2011/0198847 A1* | 8/2011 | Hopewell ............... H02M 1/34 290/44 |
| 2011/0285491 A1* | 11/2011 | Cullen ..................... H01F 3/10 336/130 |

FOREIGN PATENT DOCUMENTS

| | | |
|---|---|---|
| DE | 102010040366 A1 | 3/2012 |
| EP | 0474298 A1 | 3/1992 |
| KR | 20110052905 A | 5/2011 |
| WO | 2010049027 A1 | 5/2010 |
| WO | 2012055443 A1 | 5/2012 |
| WO | 2017198269 A1 | 11/2017 |

OTHER PUBLICATIONS

Danish Patent and Trademark Office First Techinal Examination Report for Application No. PA 2016 70341 dated Dec. 12, 2016.
PCT International Search Report for Application No. PCT/DK2017/050155 dated Aug. 24, 2017.
Chinese Office Action for Application No. 201780031093.6 dated Jan. 6, 2020.

* cited by examiner

ROTATING TRANSFORMER AND INDUCTIVE COUPLING

BACKGROUND

Field of the Invention

Aspects of the present disclosure generally relate to techniques for transferring power generated by a wind turbine generator.

Description of the Related Art

Modern power generation and distribution networks increasingly rely on renewable energy sources, such as wind turbine generators. In some cases, the wind turbine generators may be substituted for conventional, fossil fuel-based generators. Beyond merely generating and delivering electrical power, the wind turbine generators are responsible for contributing to grid stability through frequency regulation. Multi-rotor wind turbines provide several advantages over single rotor wind turbines, such as ease of installation, maintenance, and transportation.

SUMMARY

Certain aspects of the present disclosure are generally directed to using a rotary transformer to transfer power for a wind turbine generator.

Certain aspects of the present disclosure are directed to a multi-rotor wind turbine. The multi-rotor wind turbine generally includes a plurality of rotors, a plurality of electrical generators, each electrical generator being coupled to one of the plurality of rotors, and one or more rotary transformers configured to transfer power between the electrical generators and a power grid, wherein each rotary transformer comprises a first winding coupled to one or more electrical generators of the plurality of electrical generators, and a second winding magnetically coupled to the first winding and coupled to the power grid, wherein the first winding is rotatable with respect to the second winding.

Certain aspects of the present disclosure are directed to a wind turbine generator. The wind turbine generator generally includes a rotor, an electrical generator coupled to the rotor, and a rotary transformer configured to transfer power between the electrical generator and a power grid, wherein a first winding of the rotary transformer is coupled to a first housing, a second winding of the rotary transformer is coupled to a second housing, and a surface of the first housing is rotatably coupled to a surface of the second housing such that at least a portion of the first winding surrounds the second winding and the first winding of the rotary transformer is rotatable with respect to the second winding of the rotary transformer.

Certain aspects of the present disclosure are directed to a wind turbine generator. The wind turbine generators generally includes a rotor, an electrical generator coupled to the rotor, and a rotary transformer configured to transfer power between the electrical generator and a power grid, wherein the rotary transformer comprises a first winding, wherein the first winding comprises a first plurality of inductor coupled to a first ring shaped housing, and a second winding, wherein the second winding comprises a second plurality of inductors coupled to a second ring shaped housing, wherein the first ring shaped housing is disposed inside the second ring shaped housing such that the first winding is magnetically coupled to the second winding.

Certain aspects of the present disclosure are directed to a method of assembly of an electrical system for a multi-rotor wind turbine. The method generally includes coupling an electrical generator to each of a plurality of rotors of the multi-rotor wind turbine, providing one or more rotary transformers configured to transfer power between the electrical generators and a power grid, coupling each of the outputs of the electrical generators to a respective first winding of the one or more rotary transformers, wherein the first winding of each rotary transformer is magnetically coupled to a second winding of the respective rotary transformer, and the first winding of the rotary transformer is rotatable with respect to the second winding of the rotary transformer, and coupling the second winding to the power grid.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only aspects of this disclosure and are therefore not to be considered limiting of its scope, for the disclosure may admit to other equally effective aspects.

DETAILED DESCRIPTION

Aspects of present disclosure are generally directed to using a rotary transformer to transfer power between a rotor of a wind turbine generator and a power grid.

When a wind turbine nacelle or support bars on a wind turbine tower are yawing, power cables used to transfer power from the rotors to the power grid may get twisted. In some cases, the power cables may be rewound to prevent mechanical overload of the power cables. Aspects of the present disclosure are generally directed to using a rotary transformer to prevent the twisting of the power cables due to yawing of the wind turbine nacelle or support bars of a wind turbine generator.

A rotary transformer may include a primary winding that is magnetically coupled to a secondary winding, and may be configured such that the primary winding of the rotary transformer can rotate freely with respect to the secondary winding, while maintaining the magnetic fields between the primary and secondary windings in the transformer. Thus, power can be transferred from the rotor of the wind turbine generator to a primary winding of the rotary transformer, and power from the secondary winding of the rotary transformer may be transferred to the power grid. By using the rotary transformer to transfer power between a rotor of a wind turbine generator to the power grid, the tangling of the power cables may be prevented because the primary winding can rotate with respect to the secondary winding.

Figure 1:
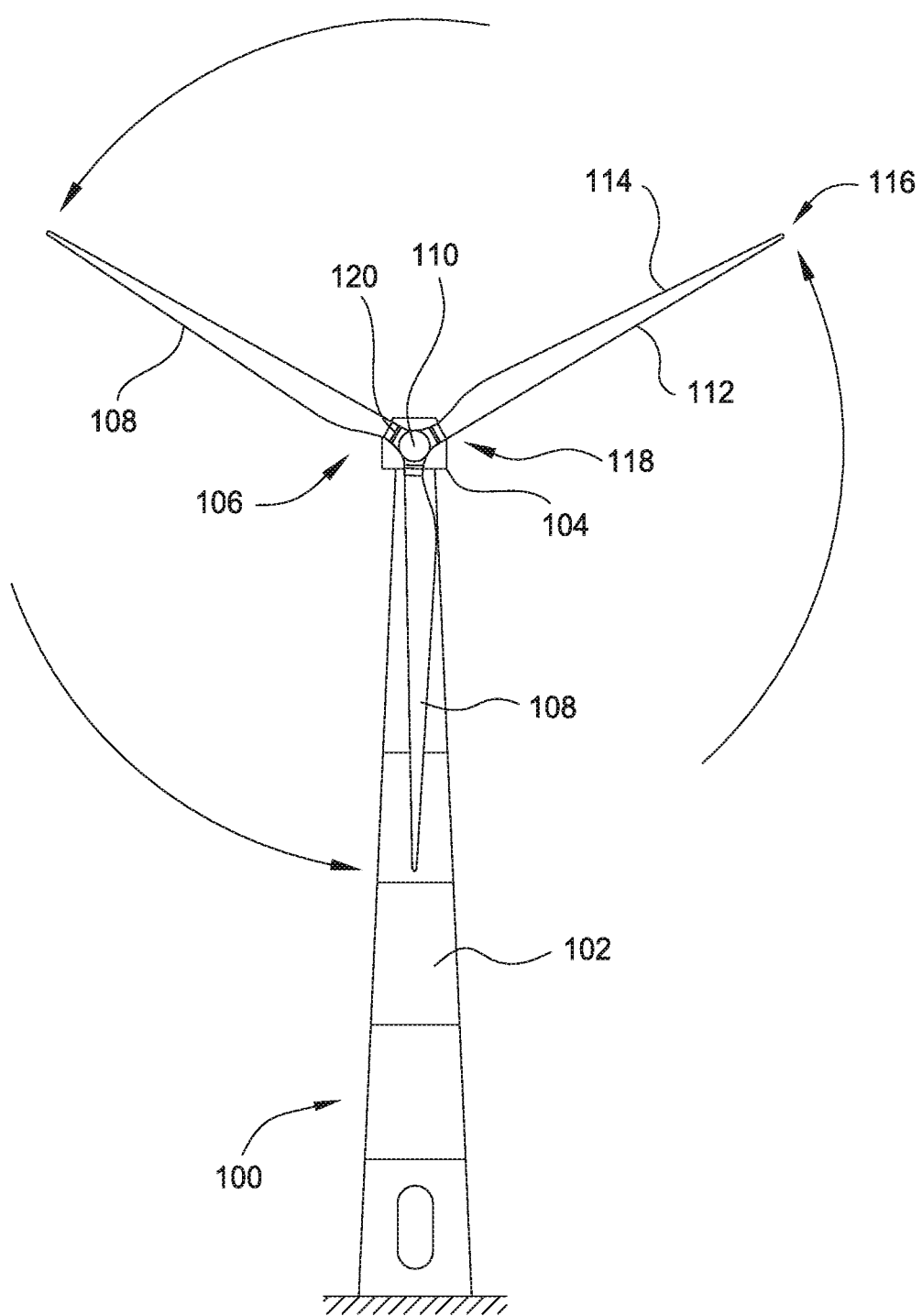
FIG. 1 illustrates an example wind turbine generator, in accordance with certain aspects of the present disclosure.

FIG. 1 illustrates an example wind turbine generator 100. The wind turbine generator 100 may include a tower 102 and a wind turbine nacelle 104 located at the top of the tower 102 relatively high off the ground to ensure good airflow. A wind turbine rotor 106 may be connected with the wind turbine nacelle 104 through a low speed shaft extending out of the nacelle 104.

The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner. The wind turbine rotor 106 may be coupled to a gearbox that powers at least one electrical generator that may be located in the wind turbine nacelle 104. This electrical energy from the electrical generator may be converted by a power conversion system to a form that can be fed into a power grid.

In certain aspects, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among other systems to increase the power generated below rated wind speeds and to reduce the power generated above the rated wind speed to prevent excessive loading on turbine components, e.g., the generator and gearbox.

In certain aspects, the wind turbine generator 100 may include a yaw system. The yaw system may be configured to rotate the wind turbine nacelle 104 with respect to the tower 102. The wind turbine nacelle 104 may be rotated based on the direction of the wind to increase power generation. Power cables may be used to transfer power generated by wind turbine rotor 106, through the tower 102, and to a power grid.

As described above, with the yawing of the wind turbine nacelle 104, these power cables may be tangled. In certain aspects of the present disclosure, the wind turbine generator 100 may include a rotary transformer, located inside the tower 102, or at the coupling point of the nacelle 104 and the tower 102. The power cables carrying power generated by the wind turbine rotor 106 may be coupled a primary winding of the rotary transformer, which may be magnetically coupled with a secondary winding, and the secondary winding may be coupled to the power grid. Thus, the power from the wind turbine rotor 106 may be transferred from the primary winding side of the rotary transformer to secondary side of the rotary transformer and the power grid. As the primary winding of the rotary transformer freely rotates with respect to the secondary winding, the primary winding of the rotary transformer may rotate with the yawing of the wind turbine nacelle 104. Thus, any tangling of the power cables due to the yawing of the wind turbine nacelle 104 may be prevented (or at least reduced).

Figure 2:
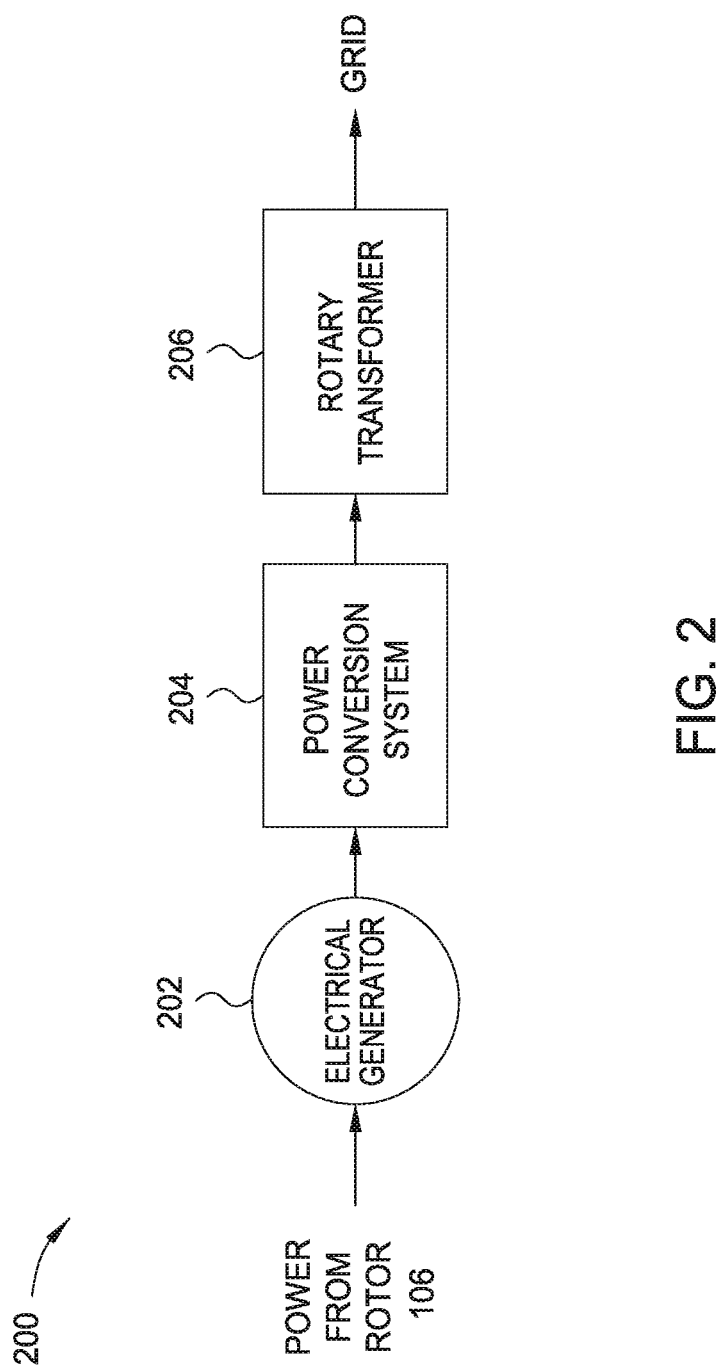
FIG. 2 illustrates an example electrical system of a wind turbine generator having a rotary transformer, in accordance with certain aspects of the present disclosure.

FIG. 2 is an example electrical system 200, in accordance with certain aspects of the present disclosure. As illustrated, the rotor 106 may power an electrical generator 202 that may be coupled to a power conversion system 204. The power conversion system 204 may be configured to increase a frequency (e.g., 10 kHz or higher) of an alternating-current (AC) signal generated by the electrical generator 202. The converted output signal of the power conversion system 204 may be coupled to a primary winding of a rotary transformer 206 via one or more power cables. Increasing the frequency of the AC signal generated by the electrical generator 202 allows for a reduction of the size of the rotary transformer 206. In some aspects, the power conversion system 204 may be located in the wind turbine nacelle 104 and the rotary transformer 206 may be located in the tower 102. In some aspects, the rotary transformer 206 may be located in the center of the tower 102, but may also be located at the top or the bottom of the tower 102.

The secondary winding of the rotary transformer 206 may be coupled to a power grid. Thus, tangling of the power cables between the power conversion system 204 and rotary transformer 206 due to the yawing of the nacelle may be prevented (or at least reduced). In some aspects, a turns ratio of the rotary transformer may be configured to step up the voltage of the output signal of the power conversion system 204. For example, a 1:5 turns ratio may be used to step up the voltage (e.g., 1 kV) across the primary winding of the rotary transformer 206, and generate a higher voltage (e.g., 5 kV) across the secondary winding of the rotary transformer 206. In some aspects, the secondary winding of the rotary transformer 206 may be coupled to a converter including a rectifier or to a power module (e.g., via insulated-gate bipolar transistors (IGBTs)) to facilitate bi-directional power share between the power grid and the wind turbine nacelle 104. For example, the power module may be configured to convert the frequency of the signal at the secondary winding of the rotary transformer 206 to the grid frequency, and vice versa.

Figure 3:
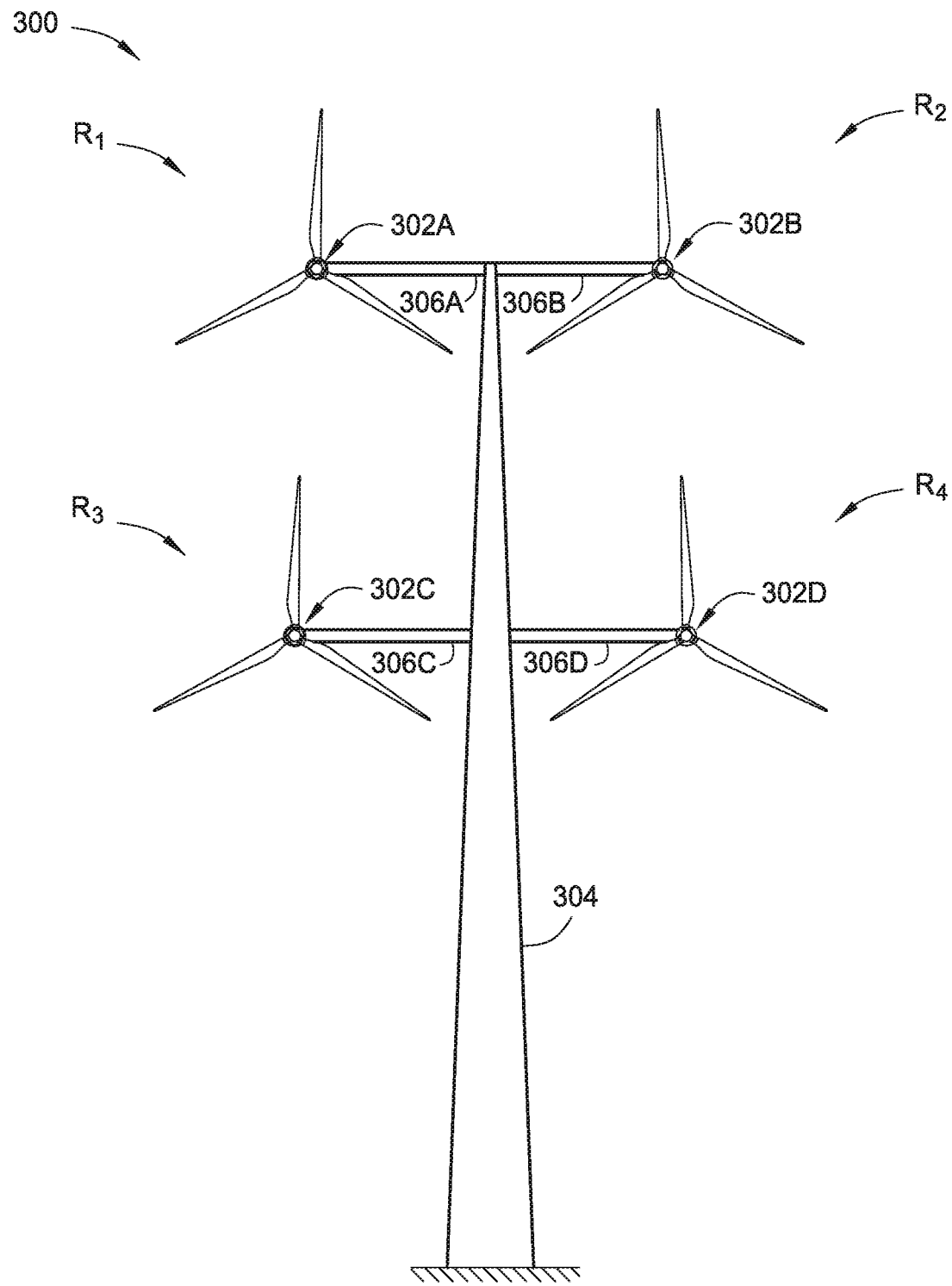
FIG. 3 illustrates an example wind turbine generator with multiple rotors, in accordance with certain aspects of the present disclosure.

FIG. 3 illustrates a wind turbine generator 300 with multiple (a plurality of) rotors $R_1$, $R_2$, $R_3$, and $R_4$ (collectively rotors $R_n$), which may be called a multi-rotor wind turbine 300. Each rotor is configured to transform kinetic energy of the wind into electrical energy. Each rotor may have a designated power conversion system located in a corresponding wind turbine nacelle 302A, 302B, 302C, and 302D (collectively wind turbine nacelles 302) of each of the rotors $R_n$. The rotors $R_n$ and the wind turbine nacelles 302 are supported by the tower 304 and support bars 306A, 306B, 306C, and 306D (collectively support bars 306).

Similar to the wind turbine generator 100, a yawing system may be used to rotate the wind turbine nacelles 302 with respect to support bars 306, or to rotate the support bars 306 with respect to the tower 304. Thus, power cables used to transfer power from each of the rotors $R_n$ to a power grid may become tangled as a result of the yawing of the wind turbine nacelles 302 or support bars 306. In certain aspects of the present disclosure, a rotary transformer may be coupled to each of the rotors $R_n$. Each of the rotary transformers may transfer power from a respective rotor to a power grid. The rotary transformers may be located in respective support bars 306 of the wind turbine generator 300 or in the tower 304.

In certain aspects of the present disclosure, the multi-rotor wind turbine 300 comprises a plurality of electrical generators, each electrical generator being coupled to one of the plurality of rotors $R_1$, $R_2$, $R_3$, and $R_4$, and the multi-rotor wind turbine 300 comprises one or more rotary transformers, e.g. one or a plurality of rotary transformers, configured to transfer power between the electrical generators and the power grid. Each rotary transformer may comprise a first winding coupled to one or more electrical generators (e.g. to a respective electrical generator) of the plurality of electrical generators, and a second winding magnetically coupled to the first winding and coupled to the power grid, wherein the first winding is rotatable with respect to the second winding.

Figure 4:
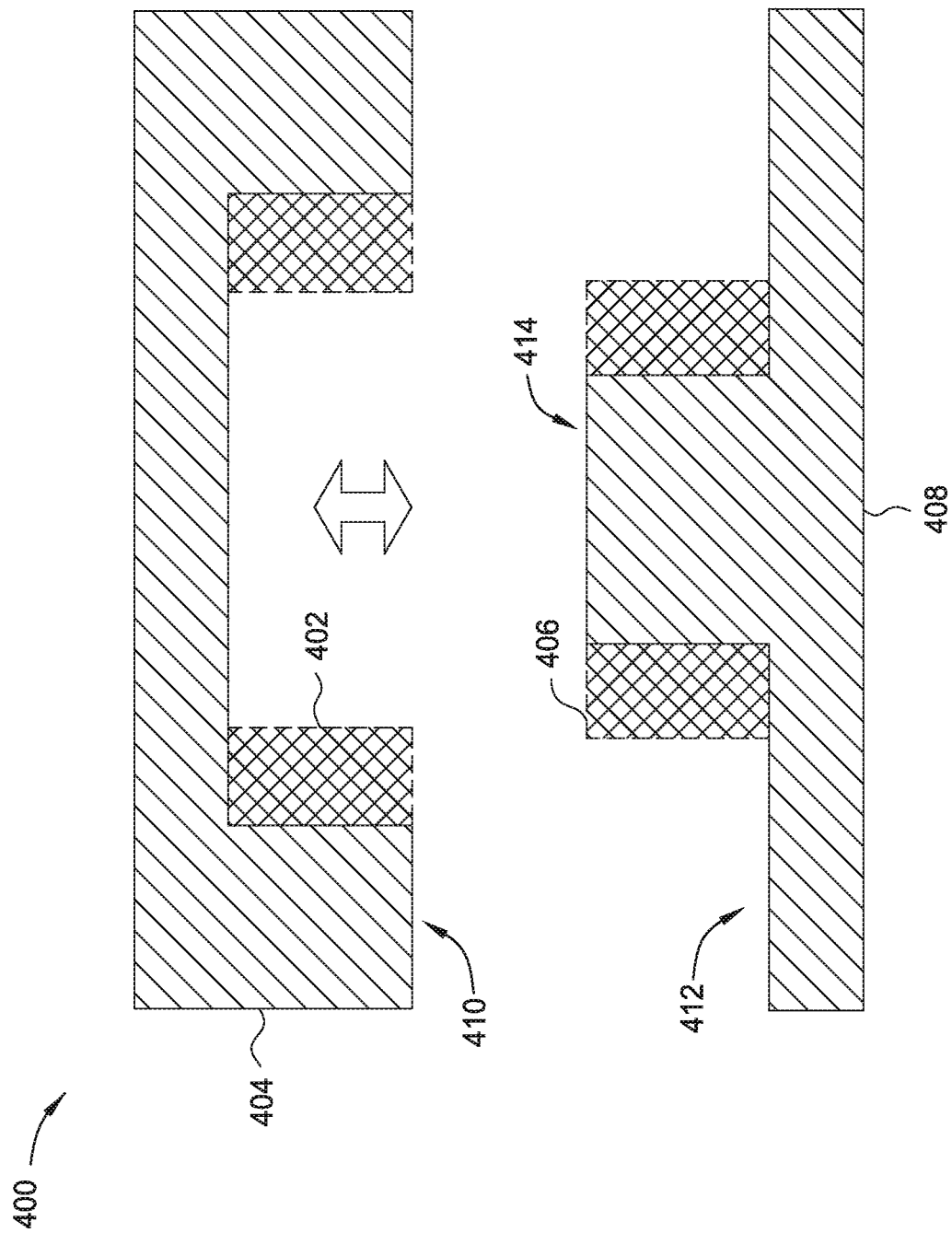
FIG. 4 illustrates a cross-section of an example rotary transformer, in accordance with certain aspects of the present disclosure.

FIG. 4 illustrates a cross-section of an example rotary transformer 400, in accordance with certain aspects of the present disclosure. The rotary transformer 400 may include a primary winding 402 coupled to a housing 404, and a secondary winding 406 coupled to a housing 408. A surface 410 of the housing 404 may be rotatably coupled to a surface 412 of the housing 408 such that the primary winding 402 surrounds the secondary winding 406. In some aspects, the surface 410 may be rotatably coupled to the surface 412 using bearings (e.g., via needle roller thrust bearings). For example, a groove in the housings 404 and/or 408 may be produced to make space for the bearings. In some aspects, the housing 408 may form a core 414 of the rotary transformer 400. For example, the secondary winding 406 may be wound around the core 414.

Figure 5:
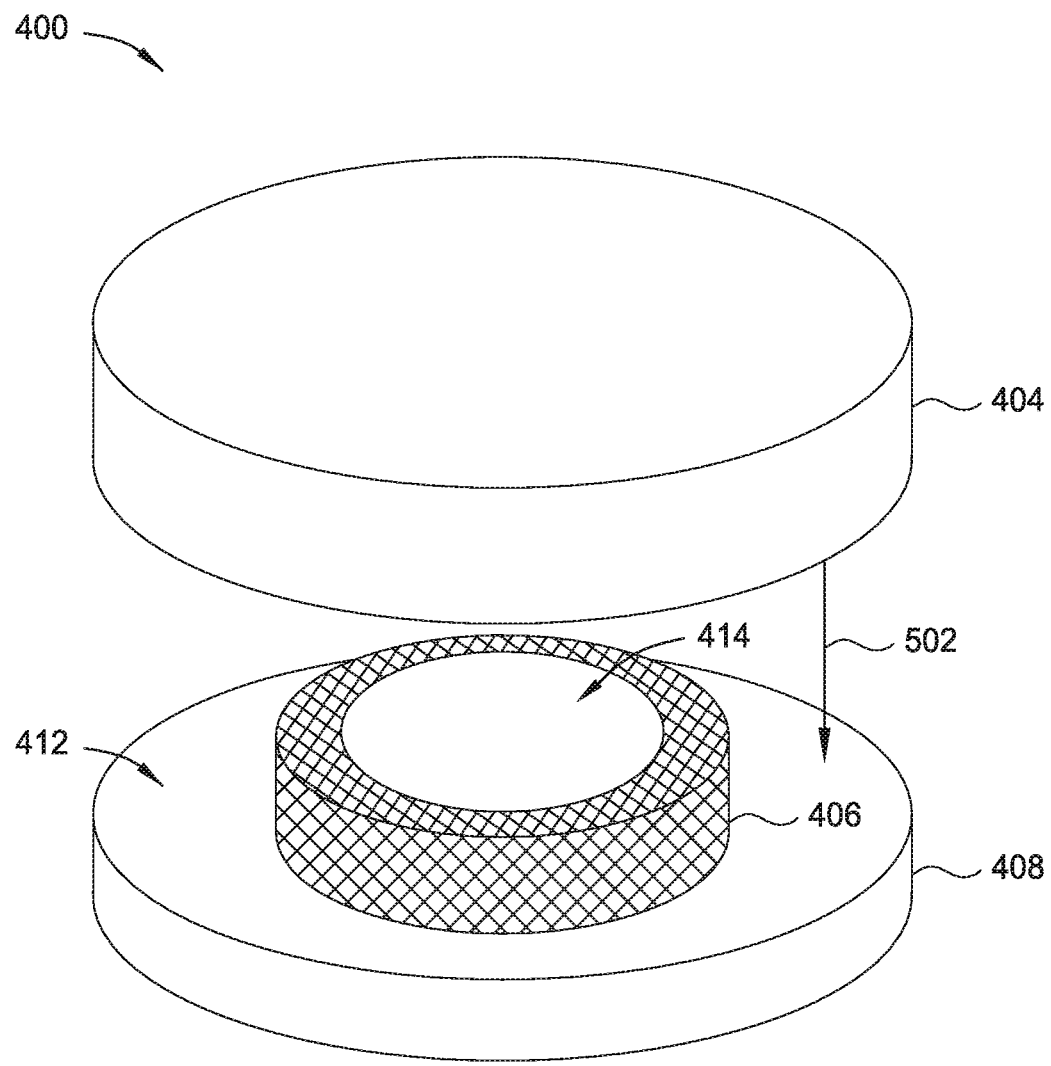
FIG. 5 is a three-dimensional view of the example rotary transformer of FIG. 4, in accordance with certain aspects of the present disclosure.

FIG. 5 is a three-dimensional view of the example rotary transformer 400, in accordance with certain aspects of the present disclosure. As illustrated, the housings 404 and 408 may be circular. The primary winding (not shown in FIG. 5) may be wound around a circumference of an inner surface of the housing 404. As shown by the arrow 502, the housing 404 may be coupled to the housing 408, such that the housing 404 as well as the primary winding rotate with respect to the housing 408 and the secondary winding 406. When the housing 404 is coupled with the housing 408, the primary winding 402 and the secondary winding 406 may be in close proximity to increase magnetic coupling between the primary and secondary windings 402 and 406. Thus, a small air gap may be present between the primary and secondary windings 402 and 406.

In some aspects, the housings 404 and 408 may be made of materials with high permeability to enhance efficiency. The primary and secondary windings 402 and 406 may be precast in polyurethane (PU) resin or varnish such that they can withstand environmental effects. In some aspects, the tower 102 may include a top portion and a bottom portion, rotatably coupled to one another. In this case, the top portion of the tower 102 may include the housing 404 and the bottom portion of the tower 102 may include the housing 408 such that power can be transferred between the two portions of the tower 102. In some aspects, the rotary transformer 400 may be located between the wind turbine nacelle 104 and the tower 102. For example, at least a portion of the housing 404 may be located in the wind turbine nacelle 104 and at least a portion of the housing 408 may be located in the tower 102.

Figure 6:
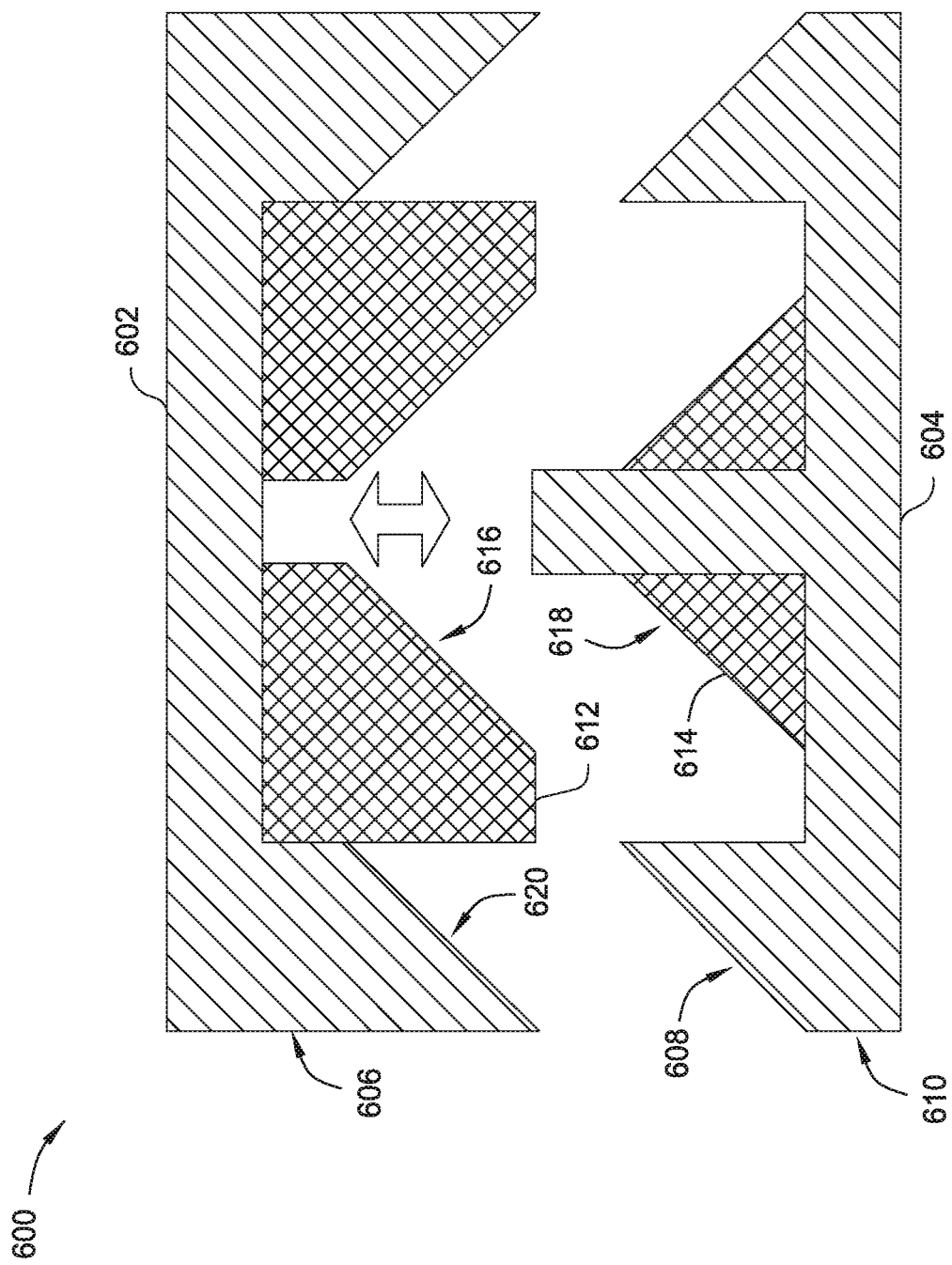
FIG. 6 illustrates a cross section of an example rotary transformer formed with an angled surface for coupling a primary and secondary side of the transformer, in accordance with certain aspects of the present disclosure.

FIG. 6 illustrates a cross-section of an example rotary transformer 600, in accordance with certain aspects of the present disclosure. As illustrated, the surface 620 of the housing 602 may be at an angle of less than ninety degrees with respect to the surface 606 on the outer perimeter of the housing 602, and the surface 608 of the housing 604 may be at an angle of greater than ninety degrees with respect to the surface 610 on the outer perimeter of the housing 604. With the surfaces 620 and 608 configured to be at an angle with respect the surfaces 606 and 610, the rotary transformer 600 may be able to more effectively withstand environmental effects. For example, water and debris may be less likely to enter the inner portions of the housings 602 and 604 and reach the primary and secondary windings 612 and 614.

In certain aspects, a surface 616 of the primary winding 612 may be formed at an angle of less than ninety degrees with respect to the surface 606 or surface 610, and surface 618 of the secondary winding 614 may be formed at an angle of greater than ninety degrees with respect to the surface 606 or surface 610. By forming surfaces 616 and 618 at an angle, water or debris may be less likely to enter and remain between the primary and secondary windings 612 and 614.

Figure 7A:
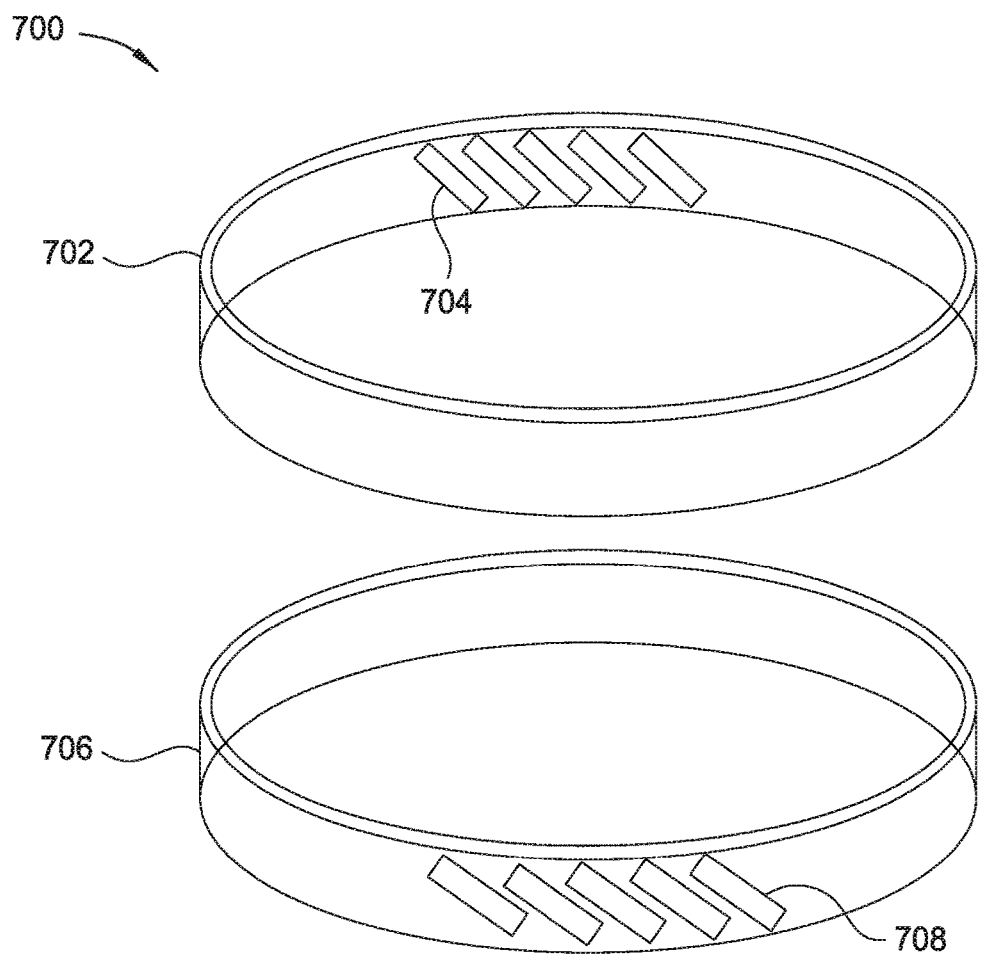
FIG. 7A illustrates an example rotary transformer formed with rings of inductors, in accordance with certain aspects of the present disclosure.

FIG. 7A illustrates an example rotary transformer 700 formed with rings of inductors, in accordance with certain aspects of the present disclosure. As illustrated, the rotary transformer 700 may include a ring shaped housing 702 coupled to a plurality of inductors 704. The rotary transformer 700 may also include another ring shaped housing 706 coupled to a plurality of inductors 708. The inductors 704 and 708 may be formed across a portion, or the entire perimeter of the outer ring shaped housing 702 or inner ring shaped housing 706, respectively. The ring shaped housing 702 may be located inside the ring shaped housing 706 such that the ring shaped housings 702 and 706 can rotate freely with respect to each other, while maintaining magnetic coupling between the inductors 704 and 708.

Figure 7B:
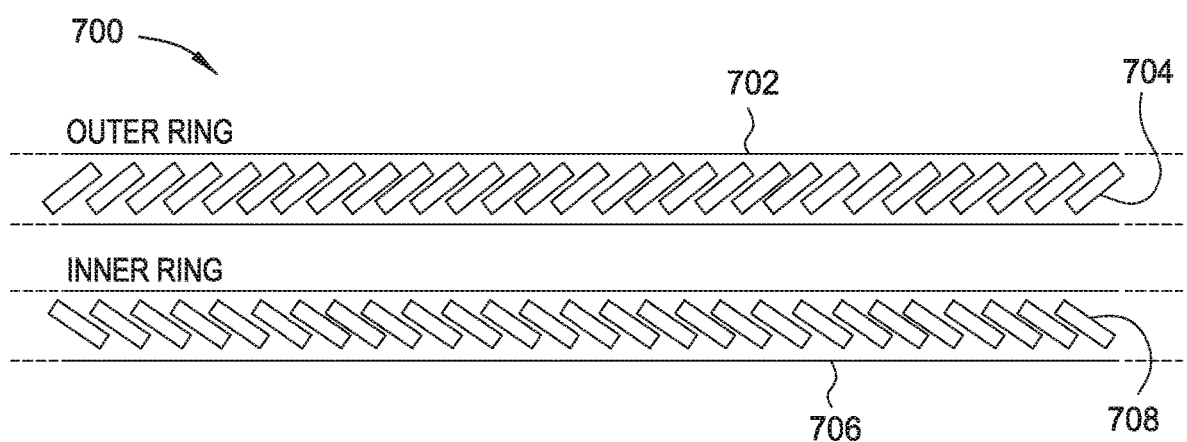
FIG. 7B illustrates the rings of the rotary transformer of FIG. 7A, in accordance with certain aspects of the present disclosure.

FIG. 7B illustrates the example ring shaped housings 702 and 706 of the rotary transformer 700, in accordance with certain aspects of the present disclosure. In some aspects, the inductors 704 and 708 may be formed at an angle (e.g., forty-five degrees) with respect a vertical direction of the ring shaped housings 702 and 706 such that the magnetic coupling between the inductors 704 and 708 stays uniform while the ring shaped housing 702 rotates with respect to the ring shaped housing 706.

In certain aspects, the inductors 704 and/or inductors 708 may be coupled in series, or in parallel, or a combination of both. For example, at least a portion of the inductors 704 and/or inductors 708 may be coupled in parallel, while another portion of the inductors 704 and/or inductors 708 may be coupled in series. In some aspects, the number of inductors coupled to the ring shaped housings 702 and/or 706 may be configured based on a desired turns ratio of the rotary transformer.

In some aspects, the rotary transformer may be a single phase transformer. In some cases, the diameter of the ring shaped housing 702 may be about the same as a diameter of the tower 102 if located in tower 102 or the support bars 306 if located inside one of the support bars 306.

Figure 8:
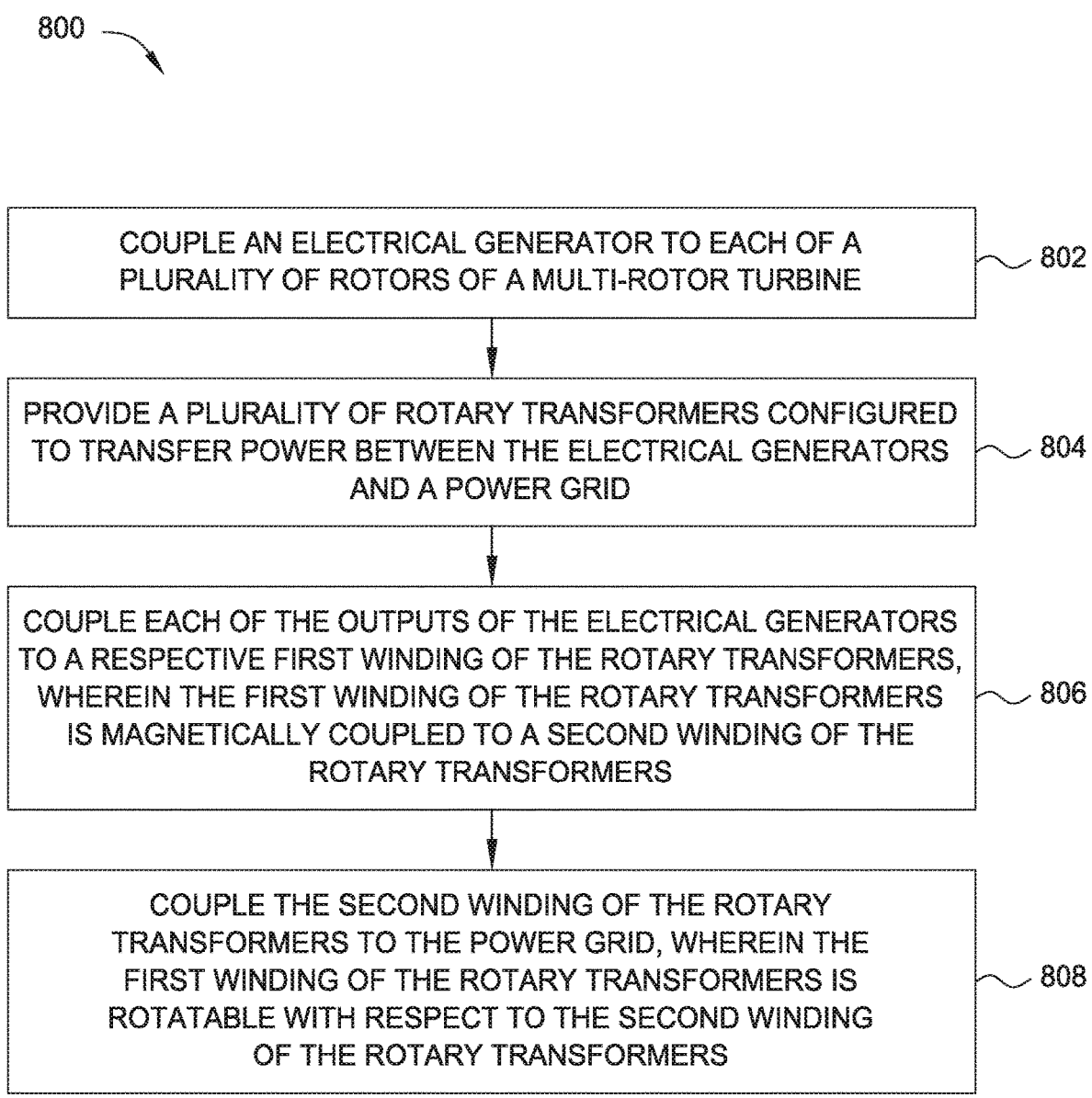
FIG. 8 illustrates example operations for assembly of an electrical system for a multi-rotor wind turbine, in accordance with aspects of the present disclosure To facilitate understanding, identical reference numerals have been used, where possible, to designate identical elements that are common to the figures. It is contemplated that elements disclosed in one aspect of the present disclosure may be beneficially utilized on other aspects without specific recitation.

FIG. 8 illustrates example operations 800 for assembly of an electrical system for a multi-rotor wind turbine, in accordance with aspects of the present disclosure. The operations 800 begin, at 802, by coupling an electrical generator to each of a plurality of rotors of the multi-rotor wind turbine, and at 804, by providing a plurality of rotary transformers configured to transfer power between the electrical generators and a power grid. The operations 800 continue at 806, by coupling each of the outputs of the electrical generators to a respective first winding of the rotary transformers. The first winding of the rotary transformers may be magnetically coupled to a second winding of the rotary transformers, and the first winding of the rotary transformers may be rotatable with respect to the second winding of the rotary transformers. At 808, the second windings of the rotary transformers may be coupled to the power grid.

In some aspects, the operations 800 also include coupling at least one power conversion system between the electrical generators and the first winding of the rotary transformer. The power conversion system may be configured to generate AC power having a higher frequency than the AC power generated by the electrical generators.

In the preceding, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the aspects disclosed herein may be embodied as a system, method, or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to aspects presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the figures illustrate the architecture, functionality, and operation of possible implementations of systems, methods, and computer program products according to various aspects. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A multi-rotor wind turbine, comprising:
   a plurality of rotors;
   a plurality of electrical generators, each electrical generator of the plurality of electrical generators being coupled to a respective one of the plurality of rotors; and
   one or more rotary transformers configured to transfer power between the plurality of electrical generators and a power grid, wherein each rotary transformer of the one or more rotary transformers comprises:
   a first ring-shaped housing;
   a first winding coupled to one or more electrical generators of the plurality of electrical generators, wherein the first winding comprises a first plurality of inductors coupled to the first ring-shaped housing, wherein each inductor of the first plurality of inductors is angled with respect to a height of the first ring-shaped housing;
   a second ring-shaped housing; and
   a second winding coupled to the power grid, wherein the second winding comprises a second plurality of inductors coupled to the second ring-shaped housing, wherein each inductor of the second plurality of inductors is angled with respect to a height of the second ring-shaped housing, wherein the first ring-shaped housing is disposed inside the second ring-shaped housing such that the first winding is magnetically coupled to the second winding, and wherein the first winding is rotatable with respect to the second winding.

2. The multi-rotor wind turbine of claim 1, wherein:
   the surface of the first ring-shaped housing is at an angle of less than ninety degrees with respect to a surface of an outer perimeter of the first ring-shaped housing; and
   the surface of the second ring-shaped housing is at an angle of greater than ninety degrees with respect to a surface of an outer perimeter of the second ring-shaped housing.

3. The multi-rotor wind turbine of claim 2, wherein:
   at least a portion of the first ring-shaped winding is located above the second ring-shaped winding with respect to a direction parallel to the respective outer perimeter of the first or second ring-shaped housings.

4. The multi-rotor wind turbine of claim 1, further comprising:
  a plurality of power conversion systems, wherein each of the plurality of power conversion systems is coupled between a respective rotary transformer of the one or more of rotary transformers and a respective electrical generator of the plurality of electrical generators.

5. The multi-rotor wind turbine of claim 1, wherein:
  each second housing comprises a core of a respective rotary transformer of the one or more rotary transformers; and
  the second winding of the respective rotary transformer is wound around the core.

6. The multi-rotor wind turbine of claim 1, wherein:
  each of the first plurality of inductors is positioned at an angle of less than ninety degrees with respect to the height of the first ring-shaped housing; and
  each of the second plurality of inductors is positioned at an angle of less than ninety degrees with respect to the height of the second ring-shaped housing.

7. The multi-rotor wind turbine of claim 6, wherein:
  each of the first plurality of inductors is positioned at a forty-five degree angle with respect to the height of the first ring-shaped housing; and
  each of the second plurality of inductors is positioned at a forty-five degree angle with respect to the height of the second ring-shaped housing.

8. The multi-rotor wind turbine of claim 1, further comprising:
  a plurality of wind turbine nacelles, wherein each rotor of the plurality of rotors is connected with a respective wind turbine nacelle of the plurality of wind turbine nacelles, and wherein each electrical generator of the plurality of electrical generators is located in the respective wind turbine nacelle;
  a tower; and
  a plurality of support bars, each coupled to the tower and rotatably connected with a respective wind turbine nacelle of the plurality of wind turbine nacelles, wherein the one or more rotary transformers comprises a plurality of rotary transformers, wherein a respective rotary transformer of the plurality of rotary transformers is located inside each support bar of the plurality of support bars.

9. A wind turbine generator, comprising:
  a rotor;
  an electrical generator coupled to the rotor; and
  a rotary transformer configured to transfer power between the electrical generator and a power grid, wherein:
    a first winding of the rotary transformer is coupled to a first housing;
    a second winding of the rotary transformer is coupled to a second housing; and
    a first surface of the first housing is rotatably coupled to a second surface of the second housing such that at least a portion of the first winding surrounds the second winding and the first winding of the rotary transformer is rotatable with respect to the second winding of the rotary transformer;
    the first surface and a third surface of the first winding are each at an angle of less than ninety degrees with respect to a surface of a first outer perimeter of the first housing; and
    the second surface and a fourth surface of the second winding are each at an angle of greater than ninety degrees with respect to a surface of a second outer perimeter of the second housing.

10. The wind turbine generator of claim 9, further comprising:
  a wind turbine nacelle, wherein the rotor is connected with the wind turbine nacelle and the electrical generator is located in the wind turbine nacelle; and
  a tower, wherein the wind turbine nacelle is rotatably coupled to the tower at a top of the tower,
  wherein the rotary transformer is coupled, at least in part, between the tower and wind turbine nacelle.

11. The wind turbine generator of claim 9, wherein:
  at least a portion of the first winding is located above the second winding with respect to a direction parallel to at least one of the first outer perimeter and the second outer perimeter.

12. A wind turbine generator, comprising:
  a rotor;
  an electrical generator coupled to the rotor; and
  a rotary transformer configured to transfer power between the electrical generator and a power grid, wherein the rotary transformer comprises:
    a first winding comprising a first plurality of inductors coupled to a first ring shaped ring-shaped housing, wherein each inductor of the first plurality of inductors is angled with respect to a height of the first ring-shaped housing; and
    a second winding comprising a second plurality of inductors coupled to a second ring shaped ring-shaped housing, wherein each inductor of the second plurality of inductors is angled with respect to a height of the second ring-shaped housing, wherein the first ring-shaped housing is disposed inside the second ring-shaped housing such that the first winding is magnetically coupled to the second winding.

13. The wind turbine generator of claim 12, wherein:
  each of the first plurality of inductors is positioned at an angle of less than ninety degrees with respect to the height of the first ring-shaped housing; and
  each of the second plurality of inductors is positioned at an angle of less than ninety degrees with respect to the height of the second ring-shaped housing.

14. The wind turbine generator of claim 12, further comprising:
  a wind turbine nacelle, wherein the rotor is connected with the wind turbine nacelle and the electrical generator is located in the wind turbine nacelle; and
  a tower, wherein the wind turbine nacelle is rotatably coupled to the tower at a top of the tower,
  wherein the rotary transformer is coupled, at least in part, between the tower and the wind turbine nacelle.

15. The wind turbine generator of claim 9, wherein the first housing and the second housing are each ring-shaped.

16. The multi-rotor wind turbine of claim 1, further comprising:
  a plurality of wind turbine nacelles, wherein each rotor of the plurality of rotors is connected with a respective wind turbine nacelle of the plurality of wind turbine nacelles, and wherein each electrical generator of the plurality of electrical generators is located in the respective wind turbine nacelle;
  a tower; and
  a plurality of support bars, each support bar of the plurality of support bars rotatably coupled to the tower and connected with a respective wind turbine nacelle of the plurality of wind turbine nacelles,
  wherein the one or more rotary transformers comprises a first rotary transformer located inside the tower.

17. The multi-rotor wind turbine of claim 16,
wherein each wind turbine nacelle of the plurality of wind turbine nacelles is rotatably connected with the respective support bar,
wherein the one or more rotary transformers comprises a plurality of rotary transformers, and
wherein a respective rotary transformer of the plurality of rotary transformers is located inside each support bar of the plurality of support bars.

18. The wind turbine generator of claim 13, wherein:
each of the first plurality of inductors is positioned at a forty-five degree angle with respect to the height of the first ring-shaped housing; and
each of the second plurality of inductors is positioned at a forty-five degree angle with respect to the height of the second ring-shaped housing.

19. The multi-rotor wind turbine of claim 1,
wherein the first plurality of inductors are arranged along an entire perimeter of the first ring-shaped housing, and
wherein the second plurality of inductors are arranged along an entire perimeter of the second ring-shaped housing.

\* \* \* \* \*